United States Patent [19]

Thudium

[11] Patent Number: 5,301,535
[45] Date of Patent: Apr. 12, 1994

[54] ARRANGEMENT FOR CHANGING THE LEVER RATIO OF A TWO-ARMED ROCKER LEVER

[75] Inventor: Karl Thudium, Wäschenbeuren, Fed. Rep. of Germany

[73] Assignee: L. Schuler Pressen GmbH, Fed. Rep. of Germany

[21] Appl. No.: 887,056

[22] Filed: May 22, 1992

[30] Foreign Application Priority Data

May 25, 1991 [DE] Fed. Rep. of Germany ........ 4117101

[51] Int. Cl.$^5$ ............................................. B21D 43/05
[52] U.S. Cl. ........................................ 72/405; 74/834
[58] Field of Search .................... 72/405; 74/834, 110; 198/621

[56] References Cited

U.S. PATENT DOCUMENTS

| | | | |
|---|---|---|---|
| 2,800,179 | 7/1957 | Münchbach . | |
| 3,421,378 | 1/1969 | Lörinc | 74/41 |
| 4,050,670 | 9/1977 | Borg | 74/110 |
| 4,234,107 | 11/1980 | Gernlein | 74/834 |
| 4,286,474 | 9/1981 | McMahon | 74/834 |
| 4,702,428 | 10/1987 | Kempster | 74/843 |
| 4,741,195 | 5/1988 | Arai | 72/405 |

FOREIGN PATENT DOCUMENTS

| | | | |
|---|---|---|---|
| 0202882 | 11/1986 | European Pat. Off. . | |
| 365026 | 4/1990 | European Pat. Off. | 72/405 |
| 1231767 | 10/1960 | France . | |

Primary Examiner—Daniel C. Crane
Attorney, Agent, or Firm—Evenson, McKeown, Edwards & Lenahan

[57] ABSTRACT

An arrangement for changing the lever ratio of a two-armed rocker lever, particularly for the transfer movements in a press. The rocker lever is pivotally connected in a lever arm and the starting movement is capable of being tapped by another lever arm. This arrangement includes a frame, a slide guide for the rocking bearing of the rocker lever, a control device, a rotation transmission device and a nut-spindle connection for the sliding movement of the slide guide relative to the rocker lever. The rocker lever, by means of the slide guide, is disposed in a pivot bearing of a support. The support is slidably guided in the frame. The support includes the nut of the nut-spindle connection for interacting with the spindle. The control device, rotation transmission device and the spindle are arranged in the frame, and a device for fixing the position of the pivot bearing in the rocker lever is connected with the rocker lever in an operatively connected manner.

6 Claims, 2 Drawing Sheets

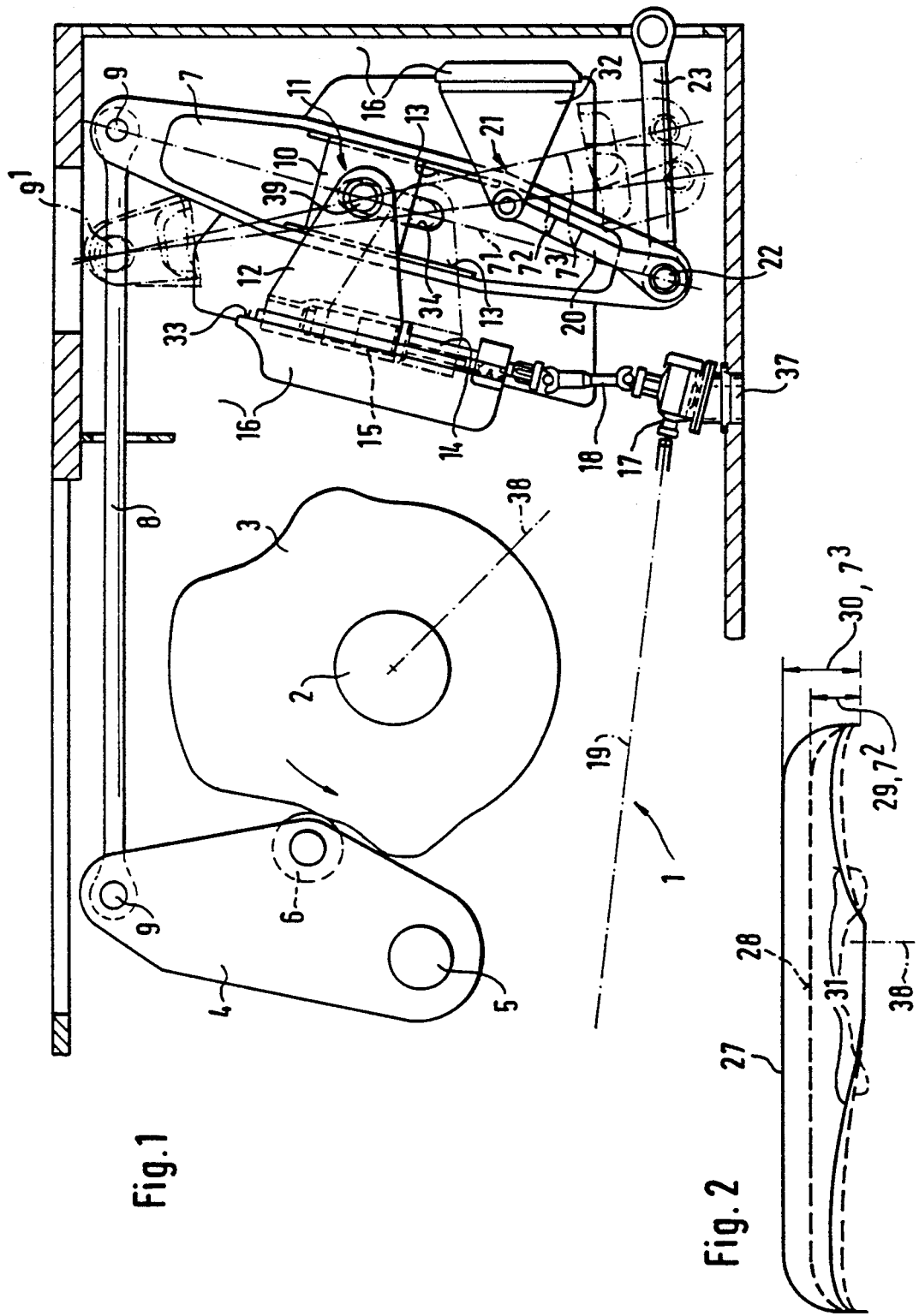

ARRANGEMENT FOR CHANGING THE LEVER RATIO OF A TWO-ARMED ROCKER LEVER

BACKGROUND AND SUMMARY OF THE INVENTION

The present invention relates to an arrangement for changing the lever ratio of a two-armed rocker lever, particularly for the transfer movements in a press. The rocker lever is pivotally connected in a lever arm and the starting movement is capable of being tapped by another lever arm. This lever arm comprises a slide guide for the rocking bearing of the rocker lever as well as a control device and rotation transmission devices and a nutspindle connection for the sliding movement of the slide guide relative to the rocker lever.

Arrangements of the above-described type are known. Thus, the German Patent Document DE-PS 959 783 shows flying shears for subdividing moving material that is to be cut, and in which the length of the section can be changed at any speed of the material to be cut. While the cutting-moving characteristic remains the same, the travelling-along speed of the blades must be adaptable. This is achieved in that the drive of one of the blades takes place by means of a thrust crank with a slide guide. The guide parts can be adjusted with respect to the driving crankshaft, and a new lever ratio can be adjusted for the thrust crank by means of a spindle-nut connection. The spindle is disposed on the frame side.

From the European Patent Document EP 0 202 882 A2, a moving drive for the transfer movements in a press is known in which the above-mentioned possibilities were not taken into account. On the contrary, the adjusting devices for changing the lever ratios of a rocker lever are disposed in this rocker lever and must be moved when the rocker lever carries out a rocking motion. In this case, two rocker levers respectively are provided for each axis of movement for the moving of workpieces through the processing stages of the press. By means of a cam follower roller, each of the rocker levers is put against a rotating cam, the profile of which determines the rocking motion of the rocker lever and thus the stroke length in the axes of movement. The tapping point for the transfer movement at each rocker lever can be adjusted by means of a nut-spindle connection. The automating of the adjustment takes place by means of one motor operator respectively in each of the rocker levers.

An object of the present invention is to provide a frame- o side bearing of the adjusting devices for changing the lever ratio of a two-armed rocker lever, particularly for transfer movements in a press by means of an arrangement of the bearing point of the rocker lever which is rigid during the operation.

This and other objects are achieved by the present invention which provides an arrangement for changing the lever ratio of a two-armed rocker lever, particularly for the transfer movements in a press. The rocker lever is pivotally connected in a lever arm and the starting movement is capable of being tapped by another lever arm. The arrangement includes a frame, a slide guide for the rocking bearing of the rocker lever, a control device and rotation transmission devices coupled to the control device. A nut-spindle connection is coupled to the rotation transmission device for the sliding movement of the slide guide relative to the rocker lever. The rocker lever, by means of the slide guide, is disposed in a pivot bearing of a support. The support is slidably guided in the frame. The support includes the nut of the nut-spindle connection for interacting with the spindle. The control device, rotation transmission devices and the spindle are arranged in the frame, and a device for the fixing of the position of the pivot bearing in the rocker lever is connected with the rocker lever in an operatively connected manner.

An advantage of the present invention is the possibility of changing the lever ratio in a defined position, for example, in the tool changing position. The mass that is required for this purpose is arranged close to the pivot bearing. The rocker lever is fixed in its pivot bearing. There are only slight deflecting movements in the longitudinal axis. The movement is not preset in a mechanically operated manner, for example, by means of an eccentric drive, but is cam-controlled. On the whole, the device is independent of its location in the press frame.

Other objects, advantages and novel features of the present invention will become apparent from the following detailed description of the invention when considered in conjunction with the accompanying drawings.

BRIEF DESCRIPTION OF THE DRAWINGS

FIG. 1 is a view of the overall construction of the arrangement constructed in accordance with an embodiment of the present invention.

FIG. 2 is a diagram of movements for two possible axes within the transfer movements in a press.

DETAILED DESCRIPTION OF THE DRAWINGS

Figure 3:
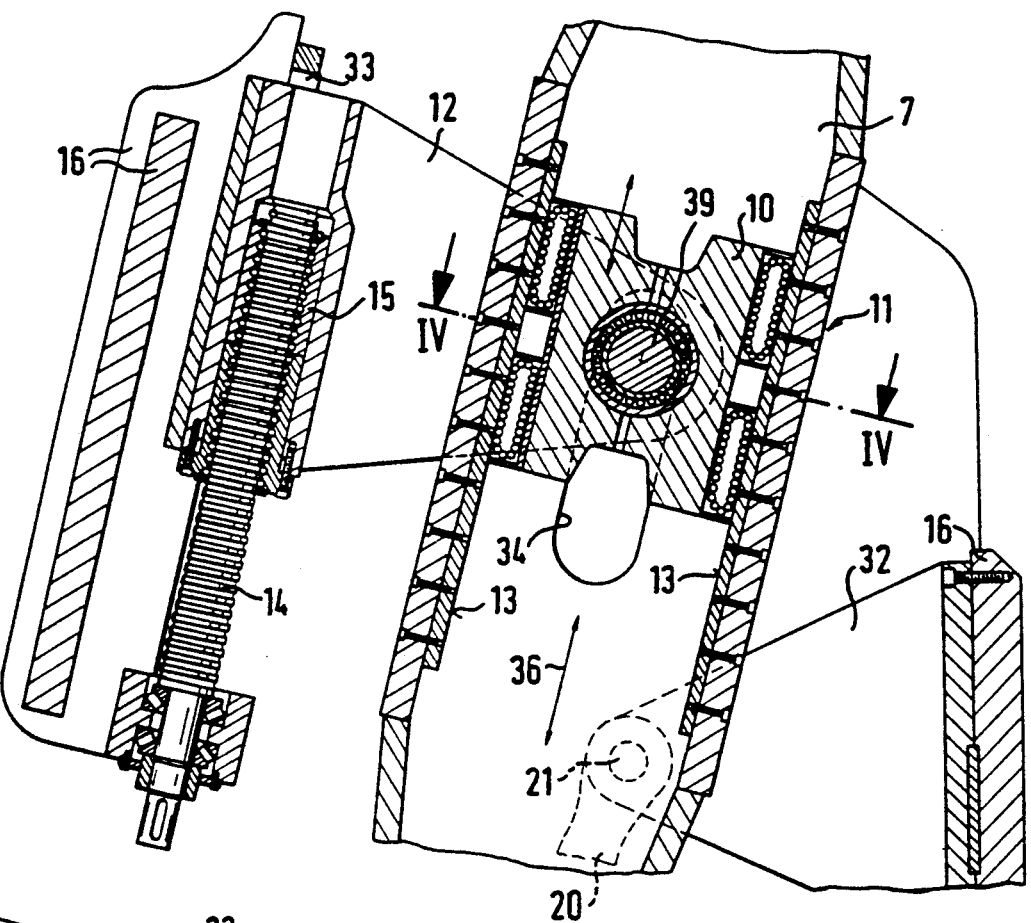
FIG. 3 is a representation of a structural component of the present invention, this representation being enlarged in comparison to FIG. 1.

In the figures, identical parts are marked with the same reference numbers. Reference number 16 indicates a frame, such as the block placed in front of a press which, as a whole, has the reference number 1. A motor-driven shaft 2 is disposed in this frame 16. On the shaft 2, a cam plate 3 is arranged for one of the transfer movements of gripper rails, lifting bars or similar transfer devices in the press. These movements may take place, for example, in three axes. The transfer movements can be defined as an opening-closing movement (1st axis), a lifting-lowering movement (2nd axis), and a transfer movement back and forth (3rd axis).

Distances between tools, dimensions of workpieces, and lifting-out (drawing) depths that differ from workpiece to workpiece and from tool to tool require changes in the movements of the transfer device. It may therefore be necessary to arrange on the shaft 2 two cams for each axis of movement; thus, a total of four cams in the case of two axes of movement, or six cams in the case of three axes of movement.

For tapping the movement, a cam follower lever 4, which is pivotally arranged in a pivot 5 fixed to the frame 16, is placed, by way of a cam follower roller 6, against the profile (external form) of the cam 3. A hydraulic or pneumatic pressure unit, which presses the cam follower roller 6 against the profile of the cam 3, is not shown. This pressure unit may also intervene at a different point of the gear train.

The tapped movement is transmitted to a rocker lever 7 by way of a link rod 8 pivotally connected in a hinge point 9 on the cam follower lever 4, this link rod 8 also being pivotally connected on this rocker lever 7 by means of the other end part in a further hinge point 9. In a center area, the rocker lever 7 has an oblong hole 34 for the passing-through of a bearing pin 39 which is held in a sliding block 10. The sliding block 10 can be slid in guides 13 of the rocker lever 7 in its longitudinal course 36 (FIG. 3). A supporting plate 12 reaches in a forktype manner in the pivot formed at 11 around the rocker lever 7 which is essentially double-T-shaped in its cross-section.

At reference number 16, the supporting plate 12 is slidably guided in guides 33 fixed to the frame and has a nut part 15 which interacts with a spindle 14. Via a hinge shaft 18 and a transmission 17, the spindle 14 can be acted upon rotatably by a control device. For illustrative purposes, only the flange area 37 of the control device is outlined in FIG. 1. When the spindle 14 is acted upon by means of a control device, which may be an electrically, hydraulically or similarly operated motor, the supporting plate 12 can be moved in the guides 33. By means of this adjusting movement of the supporting plate 12, the position of the pivot bearing 11 can be adjusted with respect to the overall length of the rocker lever 7. By acting upon the spindle 14, the transmission ratio (lever ratio) of the rocker lever 7 can therefore be changed. The tapping of the movement takes place by way of a control rod 23 which is pivotally disposed on the rocker lever 7 in the hinge 22. By means of the other end part, the control rod 23 is operatively connected, for example, with the transfer transmission for the movement of the transfer device for one moving axis. In the hinge 22, a supporting bracket 20 may be disposed which is held at its opposite end in a hinge 21 fixed at the frame 16, for example by a bracket metal sheet 32 at reference number 16 so that the rocker lever 7 is guided in a restricted manner on a circular arc in the end part having the hinge 22. As a result, locking devices between the rocker lever 7 and the sliding block 10 are not required. In an embodiment of the present invention, the slide block 10 is fixed on the rocker lever 7. For this purpose, a clamping-wedge connection can be inserted between the sliding block 10 and the rocker lever 7 which is power/path-controlled hydraulically or in a similar manner and can be separated.

The rocker lever 7 is shown in FIG. 1 in a starting position, the center axis of which has the reference number $7^1$. In the two possible end positions, which can be achieved by the position changes caused by the adjusting movement of the spindle 14, by which changes of the lever ratio of the rocker lever 7 are made, the rocker lever 7 is only outlined. The cam tap from cam 3 generally causes a movement of the hinge point 9 on the rocker lever 7 into the position indicated by reference number $9^1$. According to the lever ratio, based on the position of the pivot bearing 11, the indicated end positions are achieved for the hinge 22. The position of the rocker lever 7 in the two possible end positions are marked with reference numbers $7^2$, $7^3$.

When the cam plate 3 is rotated counterclockwise and the detent is passed at 38, the centers of the spindle 14 and of the rocker lever 7 are aligned parallel to one another. In this position, the press can be stopped, and an exchange may take place of the tool or of the tool sets. The parallel alignment of the spindle 14 and the rocker lever 7 is required for the change of its lever ratio. For the parallel operation of, for example, two gripper rails or lifting bars, for each of the axes of movement, here, for the lifting and lowering, the transmission 17, by way of a rotating shaft 19, which is driven synchronously with the drive shaft 18, is operatively connected with another transmission. By means of this other transmission, the transmission 17 is operatively connected with a second drive shaft driving a second nut - spindle connection.

FIG. 2 illustrates the possibility of changing the lever ratio for the lifting-lowering movements as one of the possible transfer movements. The transfer movements of the workpieces in the press may take place corresponding to line 27 or corresponding to line 28. The lifting-lowering movements caused by the cam 3 have the reference numbers 29 and 30. The transfer movements 27 and 28 cause the removal of workpieces from the tools and the depositing of workpieces in the tools. The smaller lifting-lowering movement 29, in this case, is caused by the movement of the rocker lever 7 from the starting position $7^1$ into the end position $7^2$; the larger lifting-lowering movement 30 is caused by the movement of the rocker lever 7 from the starting position $7^1$ into the end position with the reference number $7^3$. The return movement of the transfer devices in the press has the reference number 31 in which, corresponding to the design of the profile of the cam 3, a lifting and lowering of the transfer devices in the press is also possible. Position 38 represents the cam position during the period of the stopping of the press.

Figure 4:
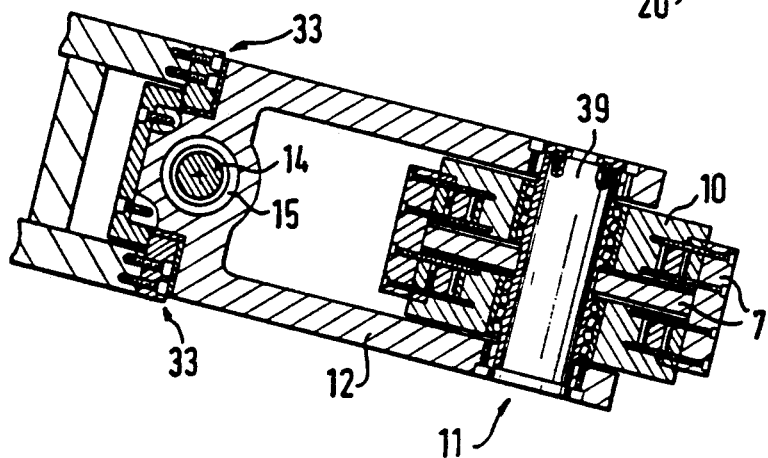
FIG. 4 is a sectional representation corresponding to section IV—IV in FIG. 3.

FIGS. 3 and 4 more, clearly show the details of an embodiment of a device for changing the lever ratio of the rocker lever 7. The sliding block 10 has bearings which roll off on the running surfaces 13. Also, the bearing of the rocker lever 7 by means of the sliding block 10, the bearing pin 39 and the supporting plate 12 by way of rolling bearings is shown more clearly. In this case, the supporting plate 12 is used for the receiving of the bearing point (pivot 11) and, at the same time, the supporting plate 12 is adjustable in the guides 33 by means of the rotatably driven spindle 14. The other reference numbers refer to identical components explained with respect to FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for changing the lever ratio of a two-armed rocking lever for the transfer movements in a press, comprising:
    a first lever arm for transmitting driving movement;
    a rocker lever having a driven end pivotally connected to the first lever arm and an output end;
    a second lever arm pivotally connected to the output end of the rocker lever so that said second lever arm is driven by said rocker lever;
    a frame;
    a slide guide slidably coupled to the rocker lever for providing a rocking bearing of the rocker lever;
    a control device;
    a rotation transmission device coupled to the control device;
    a nut-spindle connection coupled to the rotation transmission device for providing sliding movement of the slide guide relative to the worker lever;

a support slidably guided in the frame and having a pivot bearing held in the slide guide, the rocker lever being disposed on the pivot bearing, said support being coupled to the nut of the nut-spindle connection for interaction with the spindle so as to move the support, the slide guide, and the pivot bearing relative to the rocker lever to change the lever ratio; and;

means for fixing the position of the pivot bearing in the rocker lever, said means for fixing being connected with the rocker lever in an operatively connected manner; and a supporting bracket disposed on the frame, said supporting bracket pivotally supporting said rocker lever at the output end of the rocker lever;

wherein the control device, the rotation transmission device and the spindle are fixed of the frame.

2. An arrangement according of claim 1, wherein the rocker lever has running surfaces along its longitudinal course and the slide guide for the pivot bearing of the rocker lever includes a sliding block that accommodates the pivot bearing in its essentially central area, and in its essentially outer areas, is slidably disposed in said running surfaces.

3. An arrangement according to claim 2, wherein the spindle and a moving direction of the sliding block or the longitudinal course of the rocker lever in a tool changing position extend parallel to one another.

4. An arrangement according to claim 1, wherein the supporting bracket is disposed in the hinge for tapping the transfer movements on the rocker lever.

5. An arrangement according to claim 1, having at least two two-armed rocker levers for the transfer movements, wherein for each rocker lever, a separate spindle is arranged for the sliding movement of a sliding block, and the spindles of both rocker levers are operatively connected with one another and with a common control device by a rotation transmission device.

6. An arrangement according to claim 1, wherein the driver end of the rocker lever is pivotally connected to the first lever arm such that the driver end of the rocker lever is freely guided.

* * * * *